Patented Jan. 29, 1935

1,989,557

UNITED STATES PATENT OFFICE 1,989,557

SOLDERING FLUX

Richard E. Müller, Berlin-Wilmersdorf, Germany, assignor to Kuppers Metallwerke, Gesellschaft m. b. H., Bonn, Germany, a company of Germany No Drawing. Application December 22, 1930, Serial No. 504,226. In Germany December 27, 1929

2 Claims. (Cl. 148—23)

The customary cleaning and flux materials employed in soldering, such as ammonium chloride and zinc chloride, do not result in soldering free from objection, since the soldered part tends to corrode, so that the use of those inorganic soldering materials is for many purposes, inter alia in the electric industry, excluded. In certain cases, therefore, the otherwise usual reagents having a high pickling action with regard to the metals to be soldered are not used, but instead a resin particularly colophonium is employed. The advantage of colophonium which usually is employed in the form of colophonium-tin, i. e. as filling in a tube made from a tin alloy, has been attributed hitherto to the circumstance that it exhibits a considerably milder pickling action than the soldering agents commonly known, and that therefore the soldered part shows no corrosion after soldering.

This advantage of colophonium is, however at the same time a disadvantage, since the slight pickling action calls for a high consumption of soldering material and of solder metal and great loss of time in the soldering operation.

Contrary to the prevailing conception regarding the advantage of colophonium, the applicant has learned that this not only depends upon the slight pickling action, but in addition on the fact that the abundantly used colophonium is not only consumed by the soldering heat but also the soldered place on cooling is provided with a perfect thin lacquer-like skin. This skin keeps out the atmospheric moisture and other chemical influences from the soldered place which, otherwise, as a point of contact between various metals of different electrical potentials, forms a couple and thus leads to corrosion.

The present invention is intended to employ this new information as to the advantage of colophonium without its disadvantages coming into question.

According to the invention colophonium or another resin of similar properties is provided with a special pickling agent which considerably increases the cleaning action thereof with regard to the metal to be soldered. For this purpose the known inorganic materials are unsuitable in the first place because on soldering they will not flow over the metal surface with the resin, but are thrown up by the melted resin and floats thereon and so cannot be employed for this purpose and others cannot be employed because they readily split off mineral acids or leave behind hygroscopic residues at the soldered place.

It has, however, already been suggested to mix colophonium with various pickling agents. These suggestions, however, cannot be carried into practice, since they do not make use of the new knowledge stated above. With these known materials either the colophonium was so altered by the addition of chemical agents that its advantageous properties were destroyed, or the nature of the pickling agent added gave rise to disadvantageous corrosion at the soldered place.

Exhaustive investigation has shown that by addition of organic bases, their derivatives or homologues to the colophonium, the pickling action is in a surprising measure increased and that thereby a considerably quicker melting and adherence of the soldered metal is possible without the disadvantages arising which the use of the hitherto usual pickling agents show.

The new solder material can for example be compounded in the following manner:

90 parts by weight of colophonium and 10 parts by weight of aniline hydrochloride, or 94 parts by weight of shellac and 6 parts by weight of ortho-toluidine hydrochloride, or 88 parts by weight of colophonium and 12 parts by weight of diphenyl guanidine.

With the flux and pickling material according to the invention, soldered joints are obtained which meet all requirements. The flux material according to the invention is in particular suitable for the soldering of sensitive electrical apparatus and can for this purpose be used as filling in the known thin hollow wires of solder metal.

What I claim is:

1. A flux for soldering objects sensitive to corrosion comprising colophony and diphenyl-guanidine.

2. A flux for soldering objects sensitive to corrosion comprising 88 parts by weight of colophony and 12 parts by weight of diphenyl-guanidine.

RICHARD E. MÜLLER.